Jan. 14, 1958

A. F. SPERRY ET AL 2,820,217

CONTROL AND ANNUNCIATOR SYSTEM

Filed Dec. 16, 1955

INVENTORS:
ALBERT F. SPERRY
ROBERT J. MARMORSTONE

BY Russell E. Hatten

ATT'Y

Jan. 14, 1958  A. F. SPERRY ET AL  2,820,217
CONTROL AND ANNUNCIATOR SYSTEM
Filed Dec. 16, 1955  3 Sheets-Sheet 2

FIG. 2

OPERATIONAL SEQUENCE

| CONDITION | PRETRIP LAMP L1 | TRIP LAMP L2 | MICRO-POSITIONER RELAY - MR | PRETRIP RELAY R1 | TRIP RELAY R2 | RESET RELAY R3 | RELAY R5 |
|---|---|---|---|---|---|---|---|
| NORMAL | OFF | OFF | ENERG. | ENERG. | ENERG. | DE-ENERG. | ENERG. |
| PROCESS TEMP. RISES WITHIN ΔT SETTING OF ΔT POT. 24 | STEADY-ON | OFF | DE-ENERG. (MOMENTARILY) | DE-ENERG. | ENERG. | DE-ENERG. | ENERG. |
| RESET P.B. 27 PRESSED (AFTER ΔT SETTING IS INCREASED TO HIGHER ΔT) | OFF | OFF | ENERG. | ENERG. | ENERG. | ENERG. MOMENTARILY | ENERG. |
| PROCESS TEMP. REACHES TRIP TEMP. | STEADY ON | STEADY ON | DE-ENERG. | DE-ENERG. | DE-ENERG. | DE-ENERG. | DE-ENERG. |
| RESET P.B. 29 PRESSED (PROCESS TEMP. BACK TO NORM.) | OFF | OFF | ENERG. | ENERG. | ENERG. | DE-ENERG. | ENERG. |
| LAMP TEST P.B. PRESSED | STEADY ON | STEADY ON | ENERG. | ENERG. | ENERG. | DE-ENERG. | ENERG. |

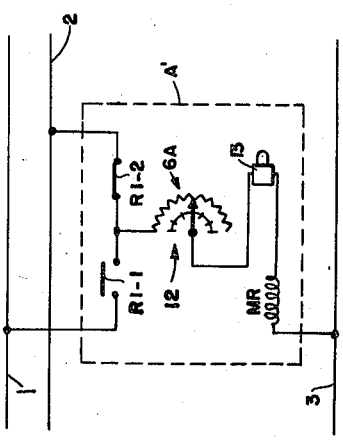

FIG. 3

INVENTORS:
ALBERT F. SPERRY
ROBERT J. MARMORSTONE

BY Russell E. Hatt

ATT'Y

INVENTORS:
ALBERT F. SPERRY
ROBERT J. MARMORSTONE

United States Patent Office 2,820,217
Patented Jan. 14, 1958

2,820,217

CONTROL AND ANNUNCIATOR SYSTEM

Albert F. Sperry, Evanston, and Robert J. Marmorstone, Chicago, Ill., assignors to Panellit, Inc., Skokie, Ill., a corporation of Illinois Application December 16, 1955, Serial No. 553,585

24 Claims. (Cl. 340—213)

This invention relates to a control and annunciator system, particularly to one which continuously monitors a large number of variables, and which gives an indication of near-abnormal variables, and which additionally automatically shuts down the apparatus being monitored and/or gives an indication of variables which have reached a shut-down, alarm or limiting condition.

There are many applications requiring the monitoring of an exceedingly large number of variables, for example, a thousand or more variables. Alarm monitoring or alarm detecting systems for such complex applications are expensive installations. It can be well appreciated that a diminution in the cost of a basic component or circuit which is multiplied hundreds or thousands of times in such a system can amount to a considerable saving of money which can well mean the difference between the gain or loss of a sale involving hundreds of thousands of dollars; and this is particularly so in the highly competitive market of the present day.

It is desirable that these alarm detecting systems provide substantially continuous monitoring of the variables. Usually, information on alarm or abnormal conditions of all the variables are presented in the form of light indications on a large panel viewable by a single operator. Often it is desirable to additionally display information on the closeness of the variables to a limiting alarm condition which would require shutdown of a system for safety purposes. Such a forewarning may prevent the necessity for shut-down if the near abnormal variables involved can be varied or otherwise controlled. Where the continuous monitoring for near-alarm conditions in addition to an alarm condition is required, each variable may have associated with it separate detecting circuits or units adjusted to detect the near-alarm and alarm conditions. These detecting units usually require sensitive and therefore relatively expensive components so that the addition of the function of monitoring for near-alarm variables requiring a doubling of the number of detecting units would result in considerable increase in cost. A possible solution to this problem would be to utilize a single additional detecting unit and then sequentially connecting this additional detecting unit to all of the test points. Because of the large number of connections in a scanning system required for this purpose, this solution is expensive also. Another disadvantage of the scanning system is the fact that there is an appreciable time lapse between the monitoring of any particular variable so that continuous monitoring is not obtained.

It is accordingly one of the objects of this invention to provide a monitoring and/or control system of the type or types above described which is appreciably less expensive and complicated than similar systems heretofore proposed.

It is another one of the objects of this invention to provide apparatus for substantially continuously monitoring a large number of process variables where the system is continuously responsive to different levels of operation of the variables, by utilizing the same detecting unit to monitor the different levels of operation of the system.

It is still another one of the objects of this invention to provide a system for detecting when a variable has reached any one of a number of selected near-alarm conditions and which automatically shuts down the system being monitored when an alarm or limiting condition exists, and/or provides an indication of the variables causing or contributing to the shut-down condition.

It is still another object of this invention to provide an alarm detecting system as just described wherein the same basic detecting unit is utilized to provide substantially continuous monitoring of the variables for more than one near-alarm condition, as well as for the alarm or limiting condition.

In accordance with the invention, each of the individual detecting units associated with the variables being monitored is conditioned normally to operate a first annunciator light when the associated variable reaches a first near-alarm condition, that is, a preset number of units from a preset alarm or limiting value. In the case where the system is to provide substantially continuous monitoring of a second and closer near-alarm condition, the initial actuation of a detecting unit by such first near-alarm condition will automatically and substantially instantaneously render the same detecting unit responsive to the next higher or second near-alarm condition. A second annunciator is lit if the variable then reaches or exceeds the second near-alarm condition. Lock-in circuits are provided to hold the indications of the first and second near-alarm annunciator lights. When the variable reaches or exceeds the second near-alarm value, the detecting circuit becomes immediately responsive to a next higher near-alarm condition or to the limiting alarm condition requiring shut-down of the system being monitored. In the latter instance, the existence of an alarm condition of any variable results in the automatic shut-down of the system being monitored, and/or the lighting of an alarm annunciator light.

A broader aspect of the invention contemplates only substantially continuous monitoring of two levels of operation, such as one near-alarm condition and an alarm condition. Also, means are provided for manually varying the near-alarm and/or the alarm level to which each detecting unit is responsive. In a preferred aspect of the invention, a single adjustable control adjusts the near-alarm condition for a large number or all of the variables.

Preferably, the detecting units include a sensitive relay in a series or bridge circuit including an alarm limit setting resistance and a resistance which varies with the variable. As the variable reaches a preset level, the current through the relay drops to a value where the relay trips. By using a circuit which progressively increases the voltage applied to the circuit as the relay is tripped in succession, the detector becomes successively conditioned to successive variable levels.

Other aspects of the invention together with an appreciation of many additional objects and advantages of the invention may be obtained by making reference to the specification to follow, taken in conjunction with the drawings, showing several embodiments of the invention.

In the drawings:

Fig. 2 is a chart showing the operational sequence of the circuit of Fig. 1;

Fig. 3 shows a modified detector circuit usable in the embodiment of Fig. 1.

Reference should now be made to the drawings where the same reference characters indicate the same elements throughout.

Figure 1:
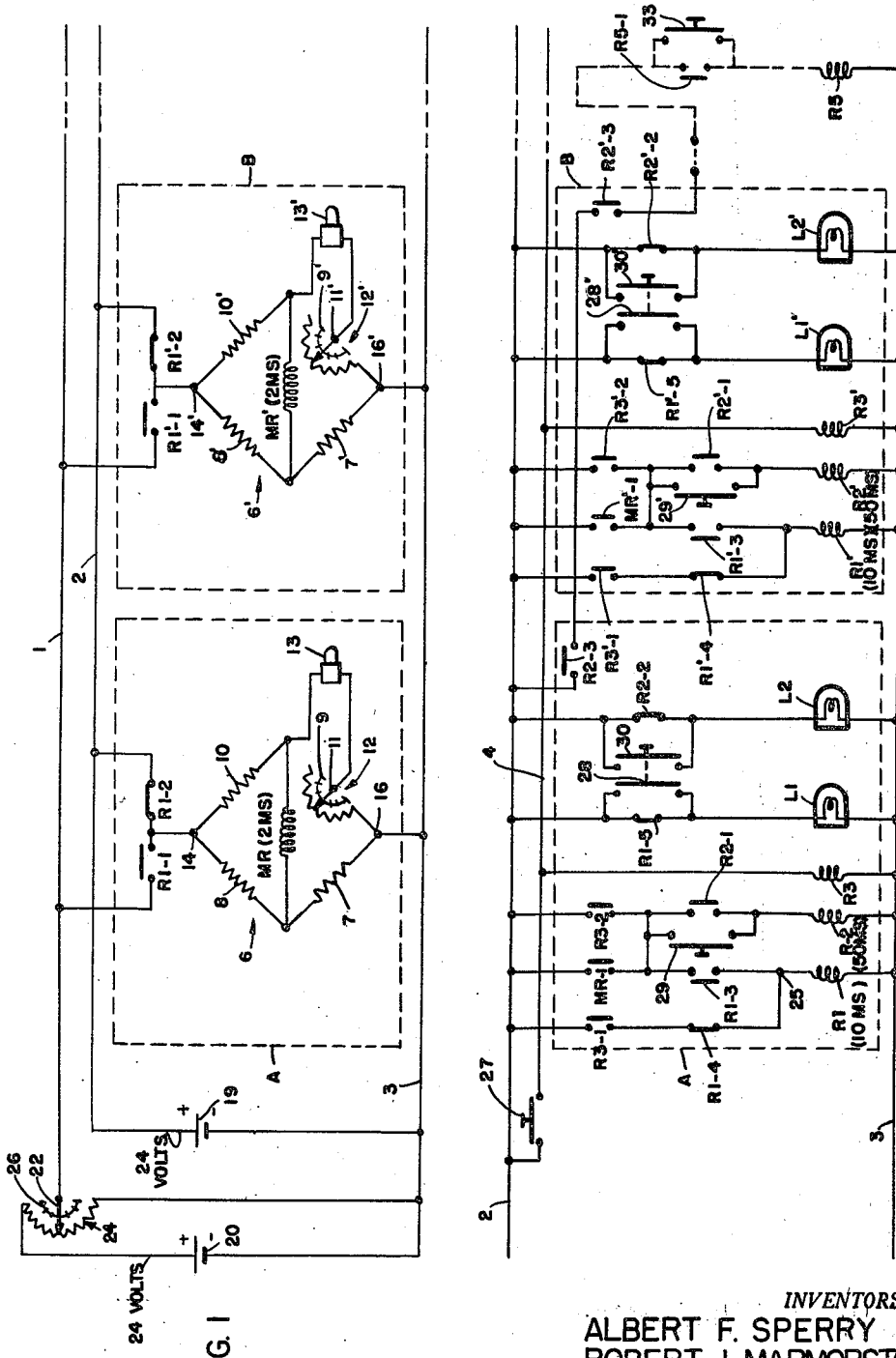
Fig. 1 is a schematic diagram of an alarm detecting system which is responsive to one near-alarm condition as well as a limiting or alarm condition for each variable.

Referring now to the embodiment shown in Fig. 1: The various elements enclosed in dotted lines and referred to by the same reference letter such as A or B form a control and annunciator circuit exclusive to a particular variable, which in the present case will be assumed to be a temperature variable, although other types of variables may be involved. The circuitry located within the dotted lines A and B are identical, and are connected in parallel between common buses 1 through 4. Although not shown, a typical system may consist of hundreds of such detecting and annunciator circuits as A and B connected across the buses 1–4 which circuits are associated with respective variables.

Each detecting and annunciator circuit includes a sensitive detecting unit such as 6, 6′, etc. Since all of the circuits may be alike, only one will be described in detail. The detecting unit 6 consists of a bridge circuit having resistance arms 7, 8 and 10, and an arm including a calibrated alarm limit setting variable resistance or rheostat 12 in series with a resistance thermometer or thermistor 13. Obviously, if variables other than temperature are involved, the variable resistance element 13 will be replaced by a suitable variable resistance transducer whose resistance varies as a function of the value of the variable involved. The alarm limit setting variable resistance 12 has a scale 9 calibrated in temperature units, and an adjusting knob 11 is provided for setting the resistance to a temperature which represents the limiting, or what will be referred to as an alarm temperature requiring shut-down of the system being monitored. It will be assumed in the exemplary form of the invention being described that the variables being monitored are variables of one overall system or process where the alarm condition of any variable will require shut-down of the system. A sensitive relay MR extends between points of connection between the resistance arms 7 and 8 on the one hand and the other resistance arm 10 and the resistance thermometer 13 on the other hand. If a voltage is applied across the junction points 14 and 16 located between the resistance elements 8—10 and the resistance elements 7 and 12, current will flow in the sensitive relay MR until the ratio of the resistance 8 to the resistance 7 is the same as the ratio of the resistance 10 to the sum of the resistances 12 and 13. The temperature resistance characteristic of the resistance thermometer 13 is such that resistance increases with temperature. If resistance arms 8 and 10 have equal resistance and if the resistance 7 has a resistance substantially greater than the sum of the resistance of the resistance thermometer 13 and variable resistance 12, as the temperature increases the current in the sensitive relay MR will gradually decrease. When the current in the sensitive relay MR falls to a predetermined low value, it will trip and its contacts will reverse position. By properly calibrating the alarm setting resistance 12, the sensitive relay MR will be actuated at the temperature indicated on the dial 9 for a particular voltage applied across bridge terminals 14 and 16. For an applied voltage less than such voltage the relay MR will be tripped at a lower temperature.

In the paragraphs to follow, the contacts of a particular relay are referred to by utilizing the same reference characters as the relay with the addition of a number representing the particular set of contacts of the relay involved. Also, the relay contacts in the drawing are shown in their positions when their control relays are de-energized, although most of the relays to be described are normally energized during quiescent operation of the system to provide a fail safe system. That is, the opening of a relay circuit will operate an annunciator light to alert an operator.

The upper bridge terminal 14 of the bridge unit 6 is normally connected to a common bus No. 1, to be sometimes referred to as preset bus No. 1, through a set of contacts R1–1 of a normally energized pretrip relay R1. The circuit is then such that the sensitive relays MR will be actuated when the associated temperature reaches a near-alarm value of a predetermined number of units from the limiting or alarm temperature value. The voltage on bus No. 1 is variable in a manner to be explained so that the near-alarm temperature which will trip the relay MR is adjustable. Actuation of the sensitive relay will energize an associated near-alarm indicating lamp L1. Means are provided for holding the indication on the lamp L1. Pretrip relay R1 will then drop out or become de-energized and the upper terminal 14 of the bridge circuit will then be transferred to the bus No. 2 through the then closed contacts R1–2 of the pretrip relay. The bus No. 2 will sometimes be referred to as the trip bus No. 2, and sometimes as the positive bus, since it is connected directly to the positive terminal of a voltage source 19. The voltage on bus No. 2 is higher than on bus No. 1 and is of such a value that the MR relay will be tripped when the temperature reaches the limiting or alarm value. Then, the actuation of the sensitive relay MR will de-energize a shut-down relay R5 which is in common with all of the variables. This will shut down the system being monitored. Also, the operation of relay R1 will de-energize a normally energized trip relay R2 which will light an alarm indicating lamp L2. The preferred means for accomplishing the above operations will now be described.

The pretrip bus No. 1 is connected to a voltage source 20 through the movable contact 22 of a potentiometer 24. Movement of the movable contact 22 will therefore vary the magnitude of the voltage applied to the pretrip bus No. 1. A calibrated scale 26 is provided on the potentiometer which indicates the number of temperature units between the temperature value which will then trip or actuate any of the sensitive relays MR, MR1, etc. of the bridge circuits 6, 6′, etc. and the limiting or alarm temperature value determined by the setting of the particular variable resistance 12 of the bridge unit. Since it is usual that the normal temperature is lower than the limiting or abnormal temperature, the number of units read on the temperature scale 26 will indicate the number of temperature units below the limiting temperature which will trip the sensitive relays of the alarm detecting system. It should be noted that the variable resistances 12, 12′, etc. may be set to different alarm limits and yet the calibration of the single potentiometer 24 will apply to all detecting circuits. That is, the same differential temperature condition will trip each sensitive relay for any setting of potentiometer 24. This is due to the fact that the variable resistances 12, 12′ are in the same arms as the thermometers 13, 13′. (Linearity of operation of thermometer 13 is assumed.)

The energization circuit for the normally energized pretrip relay R1 can be traced from a ground bus 3 through the pretrip relay coil R1, and a branch including holding contacts R1–3 and sensitive relay contacts MR–1 leading to the trip bus No. 2. The pretrip relay R1 is initially energized through a resetting branch extending from the high voltage side 25 of the relay R1 and through contacts R1–4 and contacts R3–1 of a normally de-energized reset relay R3. The relay R3 is energized to close contacts R3–1 by depression of reset push button 27 connected between the positive bus No. 2 and a common reset bus No. 4 leading to the various reset relays. The other terminal of the reset relays are connected to the ground or negative bus No. 3. Contacts R1–3 and R1–4 form a make before break contact series to insure energization of relay R1 during resetting. Momentary depression of the reset push button 27 will result in the continued energization of the control relay R1 if the temperature of the temperature variable involved is lower than the near-alarm temperature determined by the setting of the potentiometer 24, since this condition will result in the continued closing of contacts MR–1 as relay MR is in its energized (high current) stage of operation as the bridge 6 is greatly unbalanced.

When the temperature reaches the near-alarm temperature value above mentioned, the sensitive relay MR is tripped as the bridge 6 reaches a near balanced condition. This opens contacts MR–1 and de-energizes pretrip relay R1. The relay R1 is held or maintained in a de-energized state independent of the subsequent temperature of the variable involved because the then open contacts R1–3 in series with the sensitive relay contacts MR–1 hold the energization circuit of relay R1 open.

The de-energization of the control relay R1 upon the initial tripping of the sensitive relay results in the lighting of near-alarm lamp L1 whose energization circuit can be traced from the negative bus No. 3, through the filament of the lamp L1, and the then closed contacts R1–5 leading to the positive bus No. 2. A test push button 28 shunts the contacts R1–5 to provide a means for testing the lamp L1. Further, upon the de-energization of the pretrip relay R1, the upper terminal 14 of the bridge circuit is disconnected from the pretrip bus No. 1 upon the opening of contacts R1–1 and are transferred to the trip bus No. 2 through the then closed contacts R1–2. Now the bridge circuit 6 is conditioned for tripping the sensitive relay MR when the temperature reaches the limiting or alarm condition.

When the temperature reaches this limiting condition, and the sensitive relay MR is tripped, the normally energized trip relay R2 becomes de-energized. The energization circuit for the relay R2 can be traced from the negative bus No 3 through the coil of this relay, holding contacts R2–1 and the sensitive relay contacts MR–1 leading to the positive bus No. 2. Note that the contacts MR–1 are also used in the energization circuit of relay R1. A normally open reset push button switch 29, which is preferably located at the field station where the variable is being measured, is connected across the holding contacts R2–1 and, when depressed momentarily, continuously energizes the trip relay R2 if the value of the temperature variable involved is below the limiting or alarm temperature value. The trip relay R2 is a slow release relay, for example, having a release time of 50 milliseconds, to prevent the deenergization thereof when the last-mentioned sensitive relay contacts MR–1 are initially closed when the bridge circuit was conditioned for near-alarm or pretrip operation. That is, assuming that the value of the temperature variable is between the near-alarm and alarm condition, the sensitive relay contact MR–1 opens only momentarily because the higher voltage transferred to the bridge circuit upon the energization of the pretrip relay R1 will again energize or return the sensitive relay to its normal condition of operation. The sensitive relay is a fast acting relay having, for example, a delay time of only about 1 or 2 milliseconds, and the pretrip relay R1 is also faster acting than relay R2 having, for example, a delay time of about 10 milliseconds. Thus, contacts MR–1 remain open in the neighborhood of 12 milliseconds so that the trip relay R2 will not be tripped or energized when the relay R1 is initially tripped.

When the limiting or alarm temperature trips the sensitive relay MR, the bridge circuit remains connected to the trip bus through contacts R1–2, and the contacts MR–1 remain open until the temperature goes below this value. This de-energizes the trip relay R2, and results in the energization of the trip lamp L2 whose energization circuit extends from the negative bus No. 3, through the filaments of the lamp L2 and the then closed contacts R2–2 leading to the positive bus No. 2. A normally open test push button 30 shunts the contacts R2–8 to permit testing of the lamp L2.

As previously stated, the trip relay R2 is re-energized or reset by depression of the push button 29 if the temperature has returned to normal. Reset relay contacts R3–2 are connected across the sensitive relay contacts MR–1 in the energization circuit of the pretrip relay to prevent chattering of this relay. The contacts R3–2 serve no purpose in resetting the trip relay R2.

As previously stated, the alarm condition or limiting condition of the variable often requires that machinery or the particular process be shut down. The present alarm detecting circuit includes master control means responsive to the alarm condition of any one of the variables so that a process or mechanism can be automatically shut down. The master control means includes the relay R5 and associated circuitry. The relay R5 is in a normally energized circuit extending from the negative bus No. 3, through the coil of relay R5, the then closed holding contacts R5–1 across which a reset switch 33 is placed, and a series circuit including contacts R2–3, R2'–3, etc. of the trip relays associated with all of the variables in the system. This series circuit leads to the positive bus No. 2. Thus, if any of the variables reaches a limiting or alarm condition, the aforementioned series circuit will be opened de-energizing the relay R5. As previously stated, the relay R5 may be a control means for shutting off a motor or for otherwise shutting down a process. When all alarm conditions are corrected, depression of the reset switch push button 33 will re-energize the relay R5.

It should be noted that except for the reset relay circuit, all relay energization circuits are normally energized which provides a fail-safe feature which provides an alarm or near-alarm indication on the annunciator lamps when current disappears from these circuits due to other than the failure of power on the power buses.

Although from the standpoint of sensitivity and for other reasons the bridge type of detector circuit 6 is preferred, it should be understood that the series type of detector circuit may be utilized if desired. Such a series circuit is shown in Fig. 3. This modified detector circuit 6a includes the alarm limit setting variable resistance 12 in series with the resistance thermometer 13 or other condition responsive resistance element, and the sensitive relay MR. In all respects, the series circuit operates the various relay circuits shown in Fig. 1 in the same manner previously discussed.

In the system described in Fig. 1, the pretrip lamps L1 provide an indication of those variables which are in what has been referred to as a near-alarm condition, the near-alarm point being a selected point obtained by the setting of the pretrip potentiometer 24. There are applications where it is desirable to provide continuous monitoring for two or more near-alarm conditions. Such a system is shown in Fig. 4, to which reference should now be made.

Figure 4:
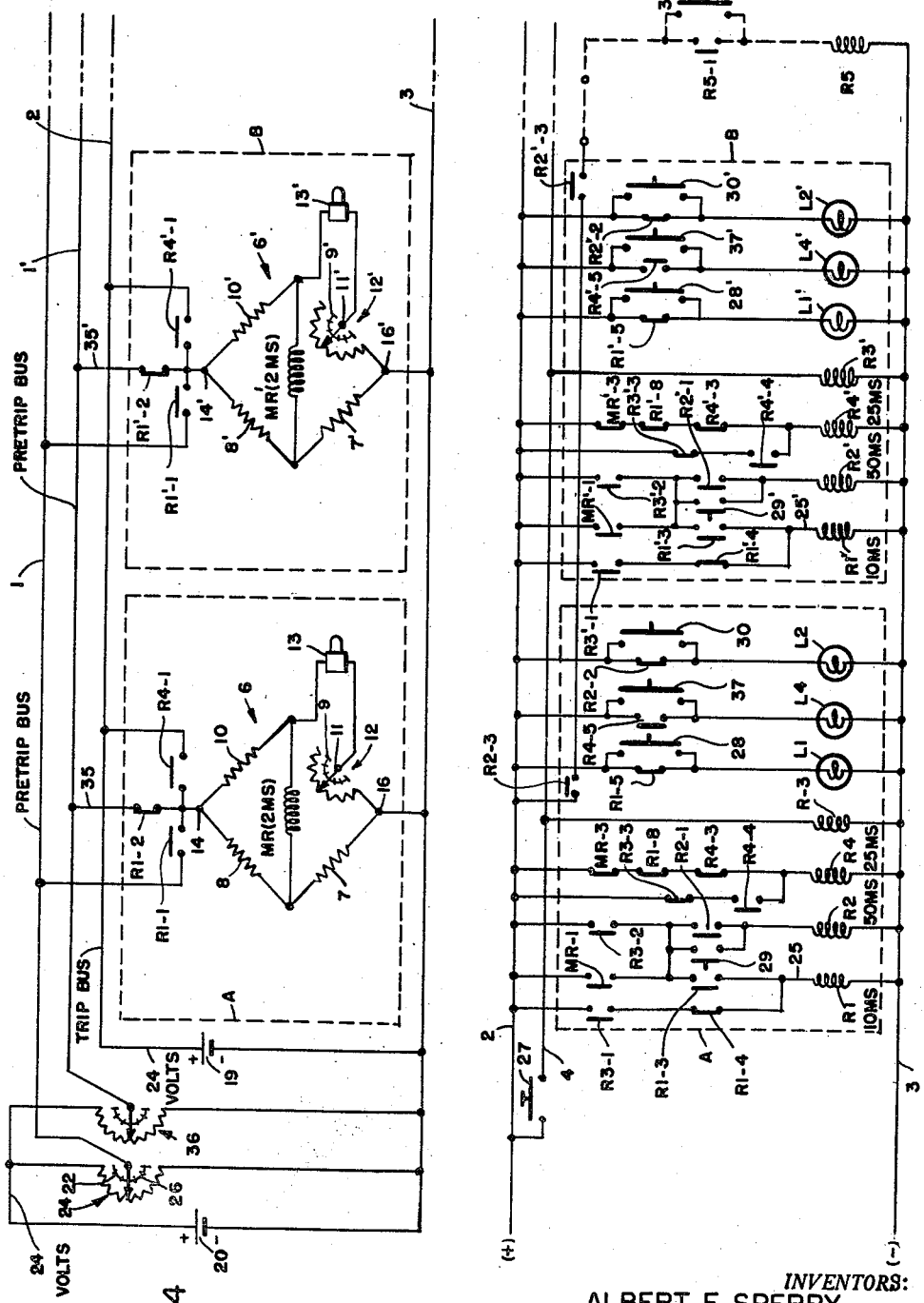
Fig. 4 is a schematic diagram of a modified alarm detecting system which in addition to the function performed by the circuit of Fig. 1 also is responsive to a second near-alarm condition by the addition of only a few relatively inexpensive components for each variable.

The modified circuit of Fig. 4 is similar to the circuit described in Fig. 1 with some additions, such as the addition of a second pretrip bus No. 1' and associated near-alarm setting potentiometer 36 which like potentiometer 24 selectively varies the voltage on the associated pretrip bus, a second pretrip relay R4 and branch circuit therefor, and a second pretrip lamp L4 and branch circuit therefor.

The second near-alarm setting potentiometer 36 is connected across the regulated source of voltage 20, and a circuit extends from the movable contact of the potentiometer 36 through the second pretrip bus No. 1', through a new branch 35 containing the transfer contacts R1–2 which in Fig. 1 lead to the trip bus No. 2, and to the upper terminal 14 of the bridge circuit 6.

For sake of discussion, it will be assumed that the second near-alarm setting potentiometer 36 will be set to a temperature which is between the near-alarm setting of the first near-alarm setting potentiometer 24 and the alarm temperature as determined by resistance 12. The branch leading from bridge terminal 14 to the trip bus No. 2 has a normally open set of relay contacts R4–1. The relay circuitry to be described is such that the upper terminal 14 of the bridge circuit is normally connected through contacts R1–1, to the first pretrip bus No. 1.

If the variable associated with any detector unit is at or above the lowest near-alarm setting determined by the setting of potentiometer 24, the sensitive relay MR will be actuated and the bridge circuit will next be connected to the second pretrip bus No. 1' upon the closing of transfer contacts R1–2'. Also, near-alarm lamp L1 will light. If the temperature of the associated variable is at or higher than the second near-alarm limit determined by the voltage supplied to the second pretrip bus, then the sensitive relay MR will again be actuated to energize the second pretrip lamp L4; the bridge circuit is then automatically connected to the trip bus No. 2 upon the closing of contact R4–1. If the temperature is at or exceeds the alarm temperature, the sensitive relay MR will be tripped and the alarm lamp L2 will light. Thus, the alarm detecting system adjusts itself automatically and sequentially for operation at different near-alarm or alarm levels where needed. Each of the lamp indications is held until resetting is accomplished.

The operation of the pretrip relay R1 and its associated circuit is identical to that described in connection with Fig. 1 and will not be again described. Following the de-energization of the pretrip relay R1 upon the first actuation of the sensitive relay MR, the second pretrip relay R4 is primed for operation. The energization circuit for the pretrip relay R4 may be traced from the negative bus No. 3 through the coil of relay R4, through a series circuit of contacts R4–3, pretrip relay contacts R1–8 and sensitive relay MR–3 leading to the positive bus No. 2. The pretrip relay R4 has a holding circuit extending from its upper terminal and through holding contacts R4–4 and normally closed reset relay contacts R3–3 leading to the positive bus No. 2. The contacts R4–3 and R4–4 are in make before break relation.

The second pretrip relay R4 is a normally de-energized relay because the contacts R1–8 in the circuit just described are open during normal operation of the system. When the first pretrip relay R1 becomes de-energized, it might appear that the closing of contacts R1–8 before the contacts MR–3 can open would energize the second pretrip relay R4 and give a possible false indication if the variable did not exceed the second alarm limit. This false operation of the second reset relay R4 is prevented by controlling the relative speeds of operation of the relays MR, R1 and R4. The MR relay being a sensitive relay is a fast acting relay which has a time delay, for example, of 2 milliseconds. The second pretrip relay R4 is relatively slow acting, for example, 25 milliseconds while the first pretrip relay R1 is fast acting relative to the relay R4, for example, 10 milliseconds. Thus, the relay R4 will not become energized when relay R1 drops out because the sensitive relay contacts MR–3 will open before the relatively slow acting relay R4 can operate.

The de-energization of the first pretrip relay R1 primes the circuit of the second pretrip relay R4 for operation so that when the MR relay is next tripped (becomes relatively de-energized), closing of the contacts MR–3 will energize the relay R4 which will seal in through the holding circuit previously described. The R4 relay cannot become re-energized until reset relay R3 is energized by depression of the common reset push button 27. Energization of the second pretrip relay R4 energizes the second pretrip lamp L4 whose energization circuit extends from the negative bus No. 3 and through the filament of the lamp L4 and the then closed contacts R4–5 leading to the positive bus No. 2. A test push button 37 shunts the contacts R4–5 for testing the lamp L4.

Energization of the second pretrip relay R4 also closes contacts R4–1 in the branch leading from the bridge terminal 14 to the high voltage bus 2, feeding a relatively high positive voltage to the upper terminal 14 of the bridge circuit to condition the same to operate the MR relay when an alarm condition is reached. When this occurs, the alarm relay R2 is tripped or de-energized in the same manner explained in connection with the circuit of Fig. 1. The alarm relay R2 was not tripped or de-energized when the relays R1 and R4 were tripped because of the slow acting nature of the R2 relay, which is assumed to be approximately 50 milliseconds. That is, the momentary closing of the sensitive relay contacts MR–1 in the energization circuit of the relay R2 takes a much smaller time than the 50 milliseconds required for the operation of relay R2.

Where resetting is desired, the common reset push button 27 is depressed which energizes the reset relay R3. This re-energizes the pretrip relay R1 upon closing of the contacts R3–1 and de-energizes relay R4 upon opening of contacts R3–3. The latter conditions of the relays are maintained if the temperature dropped to a point below the near-alarm limits. Resetting of the alarm relay R2 and its associated alarm lamp L2 is not obtained until the field reset push button across R2–1 is depressed.

In other respects the circuit of Fig. 4 is similar to the circuit of Fig. 1 previously discussed. It therefore has a master control or shut-down relay R5 which is tripped if any variable reaches the alarm limit.

In the embodiments of Figs. 1 and 4, the near-alarm limits of all detecting circuits are controlled by one or more setting potentiometers 24 and 36 common to all detecting circuits. The calibration of these potentiometers will hold for all detecting circuits irrespective of the settings of the adjustable alarm-limit-setting resistances 12, 12', etc., if the condition-responsive elements 13, 13' are linear devices. For alarm or near-alarm operation, the sum of resistances 12 and 13, and 12' and 13' are each a constant when relays MR, MR', etc. are tripped for all settings of resistances 12, 12'. If resistances 13, 13', etc. do not have linear resistance-temperature curves, then for near-alarm operation compensating resistances should be utilized if the same temperature difference is to trip all of the MR relays. These compensating resistances are ganged for operation with the associated alarm-limit-setting resistances 12, 12'. Such a compensating resistance, for example, could be placed in series between each upper bridge terminal 14, 14', etc. and each set of pretrip relay contacts connecting with a pretrip bus.

If desired, the system can be further modified to monitor additional near-alarm conditions by adding additional preset buses, potentiometers and relays.

It should be noted that the present invention provides for substantially continuous monitoring of variables for one or more adjustable near-alarm conditions and automatic shut-down for an alarm condition without requiring the expensive means of duplicating the basic relatively expensive detector circuits or of utilizing scanning techniques.

In the claims, the expression, "control means" is intended to include a means, for example, which controls the operation of the apparatus whose variables are being monitored, as well as a means which performs other control functions such as controlling an annunciator lamp.

It should be understood that numerous modifications may be made of the preferred embodiments of the invention above described without deviating from the broader aspects of the invention.

We claim:
1. Apparatus for monitoring the condition of a number of variables comprising: individual detecting means associated with said variables for continuously monitoring the condition of the variables, annunciator means associated with and controlled by each of said individual detecting means for indicating at least one level of variable operation, control means responsive to another level of operation of the variables, first means for conditioning each of said detecting means to operate the annunciator means to provide an indication of at least said one level of operation of the associated variable when a variable reaches or goes beyond said one level in a given direction, second means for conditioning each of said detecting means to operate said control means when the variable reaches or goes beyond said another level in said first given direction, means for normally rendering only said first conditioning means operative, and means responsive to initial operation of said first conditioning means when the associated variable exceeds said one level for rendering only said second conditioning means operative, whereby said detecting means becomes sequentially conditioned automatically to operation at said levels.

2. Apparatus for monitoring and controlling the condition of a number of variables comprising: individual detecting means associated with said variables for continuously monitoring the condition of the variables, individual annunciator means associated with and controlled by each of said individual detecting means for indicating at least one near-alarm level of variable operation, shut-down control means for shutting down the apparatus associated with a variable which has reached an alarm level, first means for conditioning each of said detecting means to operate the associated annunciator means to provide an indication of at least one near-alarm level of the associated variable when a variable reaches or goes beyond said near-alarm level in a given direction, second means for conditioning each of said detecting means to operate said shut-down control means when a variable reaches or goes beyond said alarm level in said first given direction, means for normally rendering only said first conditioning means operative, and means responsive to initial operation of said first conditioning means when the associated variable exceeds said one level for rendering only said second conditioning means operative, whereby said detecting means becomes sequentially conditioned automatically to operation at said near-alarm and alarm levels.

3. Apparatus for monitoring and controlling the condition of a number of variables comprising: detecting means associated with said variables for monitoring the condition of the variables, annunciator means associated with and controlled by said detecting means for indicating at least one near-alarm level of variable operation, shut-down control means for shutting down the apparatus associated with a variable which has reached an alarm level, first means for conditioning said detecting means to operate the associated annunciator means to provide an indication of at least one near-alarm level when a variable reaches or goes beyond said near-alarm level in a given direction, and second means for conditioning said detecting means to operate said shut-down control means when a variable reaches or goes beyond said alarm level in said first given direction.

4. An alarm detecting system for monitoring the condition of a large number of variables comprising: individual detecting means associated with said variables for continuously monitoring the condition of the variables, individual annunciator means associated with and controlled by each of said individual detecting means for indicating a number of levels of variable operation, first means for conditioning each of said detecting means to operate the associated annunciator means to provide an indication of at least a first condition level of the associated variable when the variable reaches or goes beyond said first condition level in a given direction, second means for conditioning each of said detecting means to operate the associated annunciator means to provide an indication of at least a second level of operation of the associated variable when the variable reaches or goes beyond said second condition level in said first given direction, means for normally rendering only said first means operative, and means responsive to initial operation of said first means for rendering only said second means operative, whereby said detecting means becomes sequentially conditioned automatically to operation at said successive levels.

5. A system for controlling and monitoring the condition of a number of variables comprising: individual detecting means associated with said variables for continuously monitoring the condition of the variables, individual annunciator means associated with and controlled by each of said individual detecting means for indicating a number of levels of variable operation, control means, first means for conditioning each of said detecting means to operate the associated annunciator means to provide an indication of one near-alarm level of operation of the associated variable when the variable reaches or goes beyond said one near-alarm level in a given direction, second means for conditioning each of said detecting means to operate the associated annunciator means to provide an indication of at least a second level of near-alarm operation of the associated variable when the variable reaches or goes beyond second level of operation in said first given direction, third means for conditioning each of said detecting means to operate said control means when the associated variable reaches or goes beyond an alarm level of operation in said direction, the first, second and third mentioned condition levels being at successive levels in the order mentioned, means for normally rendering only said first conditioning means operative, means responsive to initial operation of said first conditioning means for rendering only said second conditioning means operative, and means responsive to operation of said second conditioning means for rendering only said third conditioning means operative, whereby said detecting means becomes sequentially conditioned automatically to operation at said successive levels.

6. An alarm detecting system for monitoring the condition of a large number of variables comprising: detecting means associated with said variables for monitoring the condition of the variables, annunciator means associated with and controlled by said detecting means for indicating at least one near-alarm condition and an alarm condition of the associated variables, said detecting means being adjusted to operate the associated annunciator means to indicate an alarm condition when the associated variable reaches a predetermined value and the detecting means is conditioned for alarm operation, means for operating said annunciator means to indicate at least one near-alarm condition when the associated variables reach a value which is a predetermined number of units away from said predetermined value and the detecting means is conditioned for near-alarm operation, means for normally conditioning said detecting means for near-alarm operation, and means responsive to operation of a detecting means associated with a variable which has reached said near-alarm condition for automatically conditioning the latter detecting means for alarm operation.

7. An alarm detecting system for monitoring the condition of a large number of variables comprising: individual detecting means associated with said variables for continuously monitoring the condition of the variables, individual annunciator means associated with and controlled by each of said individual detecting means for indicating at least one near-alarm condition and an alarm condition of the associated variables, each of said detecting means being adjusted to operate the associated annunciator means to indicate an alarm condition when the associated variable reaches a predetermined value and the detecting means is conditioned for alarm operation, means for operating said annunciator means to indicate at least one near-alarm condition when the associated variables reach a value which is a predetermined number of units away from said predetermined value and the detecting means is conditioned for near-alarm operation, means for normally conditioning said detecting means for near-alarm operation, means responsive to operation of a detecting means associated with a variable which has reached said near-alarm condition for automatically conditioning the latter detecting means for alarm operation, and means for holding the near-alarm indication of said annunciator means independently of the subsequent condition of the associated variable, and means for resetting said annunciator means to prepare the system for operation to a new set of conditions.

8. Apparatus for monitoring the condition of a number of variables comprising: individual detecting means associated with said variables for continuously monitoring the condition of the variables, annunciator means associated with and controlled by each of said individual detecting means for providing at least one near-alarm indication, control means responsive to said detecting means when an alarm condition of a variable exists, each of said detecting means including adjustable means for selectively adjusting the detecting means to operate said control means when the associated variable reaches a selected alarm value, and a single adjustable means common to all of said detecting means for selectively simultaneously adjusting the same to operate the associated annunciator means to indicate at least one near-alarm condition when the associated variables reach any one of a number of selectable units away from the selected alarm value.

9. Apparatus for monitoring the condition of a number of variables comprising: individual detecting means associated with said variables for continuously monitoring the condition of the variables, annunciator means associated with and controlled by each of said individual detecting means for providing a near-alarm indication, control means responsive to said detecting means, each of said detecting means including means enabling the detecting means to operate said control means when the detecting means is conditioned for alarm operation and a variable reaches an alarm value, adjustable means common to all of said detecting means for selectively simultaneously adjusting the same to operate the associated annunciator means to indicate a near-alarm condition when the associated variables reach a value which is any one of a number of selectable units away from the alarm value and the detecting means is conditioned for near-alarm operation, means for normally conditioning said detecting means for near-alarm operation, and means responsive to operation of a detecting means associated with a variable which has reached said near-alarm condition for automatically conditioning the detecting means involved for alarm operation.

10. Apparatus for monitoring and controlling the condition of a large number of variables comprising: individual detecting means associated with said variables for continuously monitoring the condition of the variables, annunciator means associated with and controlled by each of said individual detecting means for providing a near-alarm indication, a shutdown control means for shutting down the apparatus associated with a variable which has reached an alarm value, each of said detecting means being arranged to operate the shut-down control means when the associated variable reaches the alarm value and the detecting means is conditioned for alarm operation, adjustable means for selectively adjusting the detecting means to operate the associated annunciator means to indicate a near-alarm condition when the associated variables reach a value which is a selected number of units away from its alarm value and the detecting means is conditioned for near-alarm operation, means for normally conditioning said detecting means for near-alarm operation, means responsive to operation of a detecting means associated with a variable which has reached said near-alarm condition for automatically conditioning the detecting means involved for alarm operation, and means for holding the near-alarm indication of said annunciator means independently of the subsequent condition of the associated variables, and means for resetting said annunciator means to prepare the system for operation to a new set of conditions.

11. Apparatus for monitoring the condition of a variable comprising: detecting circuit means associated with said variable and including a variable responsive current-varying device which provides a current whose magnitude progressively varies with the value of the variable, current responsive means, presettable current varying means, and means connecting said above-mentioned means in a circuit where the current flow through said current-responsive means is dependent upon said variable responsive device and said presettable means, a first source of voltage of a value to condition said detecting circuit means to operate the associated current-responsive means to a given condition of operation when the associated variable reaches a given value, said presettable current varying means including means for indicating the variable condition at which the current-responsive means will be operated to said condition when connected to said first source of voltage, at least one additional or second source of voltage which is adjustable over a range which selectively conditions said detecting circuit means to operate the associated current-responsive means to said condition of operation when the associated variable reaches a value displaced any one of a number of different selectable amounts from said given value, said adjustable source of voltage including presettable voltage adjusting means including means for indicating the differential value at which the associated current-responsive means will be operated to said condition when connected to said adjustable voltage source, means for normally connecting said second source of voltage to said detecting circuit means, and means responsive to operation of said current-responsive means to said given condition of operation thereof for disconnecting said second source of voltage and connecting said first source of adjustable voltage to said detecting circuit means, first annunciator means for indicating the operation of said current-responsive means to said condition when said second source of voltage is connected thereto, and control means responsive to operation of said current-responsive means to said condition when said first source of voltage is connected thereto.

12. Apparatus for monitoring the condition of a variable comprising: detecting circuit means associated with said variable and including a variable responsive current-varying device which provides a current whose magnitude progressively varies with the value of the variable, current responsive means, and means connecting said above-mentioned means in a circuit where the current flow through said current-responsive means is dependent upon said variable responsive device, a first source of voltage of a value to condition said detecting circuit means to operate the associated current-responsive means to a condition of operation when the associated variable reaches a given value, at least one additional or second source of voltage which conditions said detecting circuit means to operate the associated current-responsive means to said condition of operation when the associated variable reaches a value displaced a given amount from said given value, means for normally connecting said second source of voltage to said detecting circuit means, and means responsive to operation of said current-responsive means to said given condition of operation thereof for disconnecting said second source of voltage and connecting said first source of adjustable voltage to said detecting circuit means, first annunciator means for indicating the operation of said current-responsive means to said condition when said second source of voltage is connected thereto, and control means responsive to operation of said current-responsive means to said condition when said first source of voltage is connected thereto.

13. Apparatus for monitoring the condition of a large number of variables comprising: individual detecting circuit means associated with each variable and each including a condition responsive resistance means whose resistance is a function of the value of the associated variable, first relay means, and means connecting said condition-responsive resistance means and relay means in a circuit where the current flow through said relay means is dependent upon the resistance value of said condition-responsive resistance means; a first source of voltage of a value to condition said detecting circuit means to operate the associated relay means to a first position when the associated variables reach an alarm value, at least one additional source of voltage which conditions said detecting circuit means to operate the associated relay means to said first positions thereof when the associated variables reach a value displaced a predetermined number of units from said given alarm value; at least one near-alarm relay means associated respectively with each of said detecting circuit means; an energization circuit for each of said near-alarm relay means including contacts controlled by the associated first relay means for operating said near-alarm relay means to one position when the associated first relay means is in said first position thereof; means for holding said near-alarm relay means in said one position; resetting means for returning said near-alarm relay means to a normal position; a near-alarm annunciator associated with said detecting circuit means; an energization circuit for each of said near-alarm annunciator means including contacts controlled by the associated near-alarm relay means which contacts energize the associated near-alarm annunciator means when said latter relay means is in said one position thereof; a set of transfer contact means controlled by each of said near-alarm relay means which contacts connect said additional source of voltage to the associated detecting circuit means when the associated near-alarm relay means is in another or normal position thereof and which connects said first source of voltage to the associated detecting circuit means when the associated near-alarm relay means is in said one position; control relay means associated respectively with each detecting circuit means; an energization circuit for each of said control relay means including contacts controlled by the associated first relay means for operating said control relay means from a first to a second position, said control relay means being non-responsive to momentary operation of said last-mentioned contacts controlled by said first relay means; and alarm-responsive means; and an energization circuit for said alarm-responsive means including contacts of the associated control relay means which effect operation of the alarm-responsive means when the control relays are in their second positions.

14. Apparatus for monitoring and controlling the condition of a large number of variables comprising: individual detecting circuit means associated with each variable and each including a condition-responsive resistance means whose resistance is a function of the value of the associated variable, first relay means, adjustable resistance means, and means connecting said condition-responsive resistance means, relay means and adjustable resistance means in a circuit where the current flow through said relay means is dependent upon the resistance value of said condition-responsive resistance means and adjustable resistance means; a first source of voltage of a value to condition said detecting circuit means to operate the associated relay means to a first position when the associated variables reach a preset alarm value as determined by the setting of said adjustable resistance means, said adjustable resistance means including index scale means for indicating at what value the associated relay means will be operated to said first position when connected to said first source of voltage; at least one additional source of voltage which is adjustable over a range which selectively conditions said detecting circuit means to operate the associated relay means to said first positions thereof when the associated variables reach a value displaced any one of a selectable number of different amounts from said given alarm value, said adjustable source of voltage including index scale means for indicating at what differential value the associated relay means will be operated when connected to said adjustable voltage source; at least one additional near-alarm relay means associated respectively with each of said detecting circuit means; an energization circuit for each of said near-alarm relay means including contacts controlled by the associated first relay means for operating said near-alarm relay means to one position when the associated first relay means is in said first position thereof; a near-alarm annunciator associated with each detecting circuit means; an energization circuit for each of said near-alarm annunciator means including contacts controlled by the associated near-alarm relay means which contacts energize the associated near-alarm annunciator means when said latter relay means is in said one position thereof; a set of transfer contact means controlled by each of said near-alarm relay means which contacts connect said additional source of voltage to the associated detecting circuit means when the associated near-alarm relay means is in another or normal position thereof and which connects said first source of voltage to the associated detecting circuit means when the associated near-alarm relay means is in said one position thereof; individual control relay means associated respectively with each detecting circuit means; an energization circuit for each of said control relay means including contacts controlled by the associated first relay means for operating said control relay means from a first to a second position, said control relay means being non-responsive to momentary operation of said last-mentioned contacts controlled by said first relay means; shut-down control means for shutting down the apparatus associated with said variables; and an energization circuit for said shut-down control means including contacts of said control relay means which effect operation of the shut-down control means when the control relay means are in their second positions.

15. Apparatus for monitoring the condition of a large number of variables comprising: individual detecting circuit means associated with each variable and each including a condition-responsive resistance means whose resistance is a function of the value of the associated variable, first relay means, adjustable resistance means, and means connecting said condition-responsive resistance means, relay means and adjustable resistance means in a circuit where the current flow through said relay means is dependent upon the resistance value of said condition-responsive resistance means and adjustable resistance means; a first source of voltage of a value to condition said detecting circuit means to operate the associated relay means to a first position when the associated variable reach a preset alarm value as determined by the setting of said adjustable resistance means, said adjustable resistance means including index scale means for indicating at what value the associated relay means will be operated to said first position when connected to said first source of voltage; at least one additional source of voltage which is adjustable over a range which selectively conditions said detecting circuit means to operate the associated relay means to said first positions thereof when the associated variables reach a value displaced any one of a selectable number of different amounts from said alarm value, said adjustable source of voltage including index scale means for indicating at what differential value the associated relay means will be operated when connected to said adjustable voltage source; at least one near-alarm relay means associated respectively with each of said detecting circuit means; an energization circuit for each of said near-alarm relay means including contacts controlled by the associated first relay means for operating said near-alarm relay means to one position when the associated first relay means is in said first position thereof; means for holding said second relay means in said one position; resetting means for returning said near-alarm relay position to a normal position; a near-alarm annunciator associated with each detecting circuit means; an energization circuit for each of said near-alarm annunciator means including contacts controlled by the associated second relay means which contacts energize the associated near-alarm annunciator means when said latter relay means is in said one position thereof; a set of transfer contact means controlled by each of said second relay means which contacts connect said adjustable source of voltage to the associated detecting circuit means when the associated near-alarm relay means is in another or normal position thereof and which connects said first source of voltage to the associated detecting circuit means when the associated near-alarm relay means is in said one position thereof; individual control relay means associated respectively with each detecting circuit means; an energization circuit for each of said control relay means including contacts controlled by the associated first relay means for operating said control relay means from a first to a second position, said control relay means being of the slow operating type from said first position so that momentary operation of said last-mentioned contacts controlled by said first relay means will not change the position of said control relay means; and alarm-responsive means operated by said control relay means; and an energization circuit for said alarm-responsive means including contacts of the control third relay means which effect operation of the alarm-responsive means when the control relay means are in their second positions.

16. Apparatus for monitoring the condition of a number of variables comprising: an individual condition-detecting bridge circuit for each variable, each bridge circuit including a sensitive current-responsive means which is actuated when the current therethrough is a given value, means connecting each current-responsive means across a bridge detecting circuit so that the current passing through the current-responsive means is a function of the resistance of the detecting circuit, each bridge detecting circuit having an arm including a condition-responsive resistance whose resistance is a function of the value of the associated variable and an adjustable calibrated alarm-limit-setting resistance in series therewith for adjusting the point at which the current-responsive means will be actuated in terms of the value of the associated variable when energizing voltage of a first given value is connected across the input terminals of the bridge circuit, a common alarm bus for said detecting circuits, a first source of regulated voltage of said first given value connected to said alarm bus, at least one common near-alarm bus for said detecting circuits, a source of adjustable voltage connected to said near-alarm bus and including a presettable control for varying the voltage applied to said alarm bus over a range which conditions the bridge detecting circuits to operate the associated sensitive current-responsive means when the associated variables are within a range of values spaced from the alarm limit of the associated variables, said presettable control being calibrated in terms of the difference between the alarm limit of any variable and the variable value which will actuate the current-responsive means associated with said variable when said adjustable source of voltage is connected to the associated bridge detecting circuit, all the bridge detecting circuits being such that the setting of said presettable control applies to all detecting circuits even where the alarm-limit-setting resistances are set at different values, means normally operatively connecting said common near-alarm bus to the inputs of all of said detecting circuits, near-alarm annunciator means associated with each detecting circuit and responsive to actuation of the associated current-responsive means when the detecting circuits are connected to said near-alarm bus, transfer means for disconnecting said near-alarm bus and for connecting said alarm bus to the input of any detecting circuit whose current-responsive means has just been actuated; and alarm-responsive means responsive to the actuation of said current-responsive means when the associated bridge detecting circuits are connected to said alarm bus.

17. Apparatus for monitoring the condition of a number of variables comprising: an individual condition-detecting circuit for each variable, each circuit including a sensitive current-responsive means which is actuated when the current therethrough is a given value, means connecting each current-responsive means to a detecting circuit so that the current passing through the current-responsive means is a function of the resistance of the detecting circuit, the detecting circuit having a condition-responsive resistance whose resistance is a function of the value of the associated variable and an adjustable calibrated alarm-limit-setting resistance for adjusting the point at which the current-responsive means will be actuated in terms of the value of the associated variable when energizing voltage of a first given value is connected across the input terminals of the circuit; a common alarm bus for said detecting circuits, a first source of regulated voltage of said first given value connected to said alarm bus, at least one common near-alarm bus for said detecting circuits, a source of adjustable voltage connected to said near-alarm bus and including a presettable control for varying the voltage applied to said alarm bus over a range which conditions the detecting circuits to operate the associated sensitive current-responsive means when the associated variables are within a range of values spaced from the alarm limit of the associated variables, said presettable control being calibrated in terms of the difference between the alarm limit of any variable and the variable value which will actuate the current-responsive means associated with said variable when said adjustable source of voltage is connected to the associated detecting circuit, all of the detecting circuits being such that the setting of said presettable control applies to all detecting circuits even where the alarm-limit-setting resistances are set at different values, means normally operatively connecting said common near-alarm bus to the inputs of all of said detecting circuits, near-alarm annunciator means associated with each detecting circuit and responsive to actuation of the associated current-responsive means when the detecting circuits are connecting to said near-alarm bus, transfer means for disconnecting said near-alarm bus and for connecting said alarm bus to the input of any detecting circuit whose current-responsive means has just been actuated, and alarm-responsive means responsive to the actuation of said current-responsive means when the associated detecting circuits are connected to said alarm bus.

18. Apparatus for monitoring the condition of a number of variables comprising: an individual condition-detecting means for each variable for monitoring the condition of the associated variables and each including actuatable means to be actuated when a preset near alarm and a preset alarm condition exists, a presettable alarm-limit-adjusting means for setting the level at which said actuatable means will be actuated, a single near-alarm setting means common to all of said detecting means for causing said detecting means to operate said actuatable means when the associated variables are a preset number of units from their alarm condition, and each of said detecting means including means insuring the actuation of said actuatable means at the setting of said near-alarm setting means during near-alarm operation independently of the various relative settings of said alarm-limit-adjusting means.

19. Apparatus for monitoring the condition of a large number of variables comprising individual electrical detecting circuit means associated with said variables and each including a variable responsive current-varying element which provides a current whose magnitude progressively varies with the value of the variable, presettable current-varying means calibrated in terms of an alarm value of the variable, and means connecting said various means in a circuit where the amplitude of the current flow through the detecting circuit is dependent upon said variable responsive current-varying device and said presettable means, and individual indicating means associated wtih each variable for indicating the presence of a variable which has exceeded a value ahead of said alarm value of the associated variable, each of said detecting means having associated therewith individual means responsive to the variable-responsive current flowing therein for operating the associated indicating means when the current indicates that the associated variable has reached said value ahead of said preselected value.

20. Apparatus for monitoring the condition of a large number of variables comprising: individual electrical detecting circuit means associated with said variables and each including a variable responsive current-varying element which provides a current whose magnitude progressively varies with the value of the variable, current-responsive control means, presettable current-varying means calibrated in terms of the value of the variable required to operate said current-responsive control means, and means connecting said various means in a circuit where the current flow through said current-responsive control means is dependent upon said variable responsive current-varying device and said presettable means, and individual indicating means associated with each variable for indicating the presence of a variable which has exceeded a value ahead of said preselected value of the associated variable, each of said detecting means having associated therewith individual means responsive to the variable-responsive current flowing therein for operating the associated indicating means when the current indicates that the associated variable has reached said value ahead of said preselected value.

21. Apparatus for monitoring the condition of a number of variables comprising: individual detecting means associated with and responsive to each of said variables for substantially continuously monitoring the alarm condition of the variables, alarm responsive control means, said detecting means being adjusted to operate said control means when the associated variable reaches an alarm level, individual indicating means associated with each variable for indicating when the associated variable exceeds a given level ahead of said alarm level, each of said detecting means having associated therewith individual means responsive to the same detecting means which operates said control means for operating the associated indicating means when a predetermined pre-alarm level of the associated variable is exceeded, and a single adjustable manually operable control means for simultaneously and progressively adjusting the prealarm level at which said respective indicating means will be operated by said respective detecting means in terms of the same differential temperature units.

22. Apparatus for monitoring the condition of a number of variables comprising: individual detecting circuit means associated with each of said variables and each having associated therewith a variable responsive current-varying element which provides a current whose magnitude progressively varies with the value of the variable, current-responsive control means, and means for connecting said variable responsive current-varying element and said current-responsive control means in a circuit where the operation of said current-responsive control means is dependent upon said variable responsive element, a common source of voltage for said detecting circuit means which source of voltage is adjustable in amplitude over a range which selectively conditions said detecting circuit means to operate the associated current-responsive control means when the associated variables reach a value displaced any one of a number of different selectable amounts from a reference value, said adjustable source of voltage including presettable voltage adjusting means including means for indicating the number of temperature units from said reference value at which the associated current-responsive control means will be operated, individual indicating means associated with said variables, and means connecting said respective current-responsive control means and said respective indicating means for operating the latter when the associated variable reaches said preset value.

23. Apparatus for monitoring the condition of a number of variables comprising: individual detecting means responsive to the condition of said variables for continuously monitoring the condition of the variables, control means responsive to a first condition level of said detecting means, means for setting said detecting means to operate said control means when the variables reach or go beyond said condition level, individual indicating means associated with the variables for indicating when the variables reach or exceed a second condition level in the direction of said first condition level, individual means associated with each detecting means for utilizing said latter detecting means to operate the associated indicating means when the associated variable reaches or goes beyond said second condition level, means for selectively varying the condition level at which said detecting means operates said control means, and means for progressively varying the condition level at which said detecting means operates said indicating means.

24. Apparatus for monitoring the condition of a number of variables comprising: individual detecting circuit means associated with said respective variables which provides a current whose magnitude progressively varies with the value of the variable, and each including a variable-responsive current-varying device and a variable presetting element both of which effect the amplitude of current flow in the associated detecting circuit means, and current-responsive control means, said presetting elements being calibrated in terms of an alarm value, and the sum of the effects of each presetting element and the associated variable responsive device being the same for all detecting circuits where the differences between the variable values involved and the values preset on the associated presetting elements are the same, voltage source means associated in common with all of said detecting circuit means, means connecting said voltage source means, variable-responsive device and said current-responsive control means in a circuit where the operation of said current-responsive control means is dependent upon said variable responsive device and the value of the output of said voltage source means, and individual indicating means connected with each current-responsive control means to be operated when the associated current-responsive control means is operated, said voltage source means including a single, manually, progressively adjustable voltage adjusting means for simultaneously adjusting the differential value at which all of said variable-responsive control means will be operated in terms of the number of units between the values of the associated variables and the values set on the associated presetting elements.

References Cited in the file of this patent
UNITED STATES PATENTS

| | | |
|---|---|---|
| 2,578,447 | Odell et al. | Dec. 11, 1951 |
| 2,719,912 | Maenpoa et al. | Oct. 4, 1955 |

FOREIGN PATENTS

| | | |
|---|---|---|
| 266,798 | Great Britain | Feb. 28, 1927 |